United States Patent [19]

Townshend

[11] 4,153,320

[45] May 8, 1979

[54] CONNECTOR FOR A CABLE, HOSE OR THE LIKE

[75] Inventor: Maurice P. Townshend, Castle Cary, England

[73] Assignee: Plessey Handel und Investments AG, Zug, Switzerland

[21] Appl. No.: 836,799

[22] Filed: Sep. 26, 1977

[30] Foreign Application Priority Data

Dec. 21, 1976 [GB] United Kingdom ............... 53283/76

[51] Int. Cl.² ........................ F16L 37/26; H01R 13/54
[52] U.S. Cl. .................................. 339/91 B; 285/85; 285/322
[58] Field of Search ............ 339/91 R, 91 B; 285/81, 285/84, 85, 322, 323, 308

[56] References Cited

U.S. PATENT DOCUMENTS 3,810,073  5/1974  Zajac et al. ..................... 339/91 R

FOREIGN PATENT DOCUMENTS 843859  8/1960  United Kingdom ................... 339/91 B Primary Examiner—Roy Lake
Assistant Examiner—E. F. Desmond
Attorney, Agent, or Firm—Fleit & Jacobson

[57] ABSTRACT

A connector for a cable, hose or the like, which connector comprises a pin, a female portion having a collar, and a male portion having a ring of members which are adapted to move outwardly when the pin is pushed between a pair of the members and which are adapted to move inwardly when the pin is pulled out from between the pair of members, the members in the ring being effective to engage the collar in their outward position and so retain the male and female portions together, and the members in the ring being disengaged from the collar when they are in their inward position such that the male and female portions can separate.

11 Claims, 4 Drawing Figures

CONNECTOR FOR A CABLE, HOSE OR THE LIKE

This invention relates to a connector for a cable, hose or the like.

More specifically, this invention provides a connector for a cable, hose or the like, which connector comprises a pin, a female portion having a collar, and a male portion having a ring of members which are adapted to move outwardly when the pin is pushed between a pair of the members and which are adapted to move inwardly when the pin is pulled out from between the pair of members, the members in the ring being effective to engage the collar in their outward position and so retain the male and female portions together, and the members in the ring being disengaged from the collar when they are in their inward position such that the male and female portions can separate.

The connector of the present invention is especially suitable for use in the towing of underwater electrical cables which require to be disconnected by remote control whilst under tow. It is to be appreciated however that the connector of the present invention can be used in any strain cable application and it need not only be used under water. Thus, for example, the connector of the present invention can be used for general towing cable release purposes. The connector can also be used for releasing hoses during bunkering operations such for example as where a vessel is being fed with fresh water or fuel through a pipe.

Preferably, the collar screws to the remainder of the female portion although other fixing means may be employed if desired. Advantageously, the female portion is provided with a locking ring so that the collar can screw up to this locking ring.

Usually, the ring of members will operate in a recess in the female portion. The ring of members is preferably a ring of rollers and, advantageously, the rollers are held in their respective positions by a circlip. The circlip may be received in a groove formed in the face of the rollers.

Preferably, the rollers have convex sides and, in this case, the circlip may pass through the point of contact between the rollers. The convex sides of the rollers enable them to move inwardly and outwardly relatively easily without too much rubbing on each other. When the circlip passes through the point of contact between the rollers, the ends of the circlip do not move substantially with respect to the individual rollers of the ring of rollers and this is effective to reduce friction between the circlip and the rollers. Members other than rollers may be employed such for example as wedges.

The cable connector of the invention may include electrical connector devices. These electrical connector devices can be of the pin-and-socket type. If the cable connector is separated under water, the electrical connector devices will become wet. It is therefore advantageous to employ removable electrical connector devices so that the wet connector devices can be removed for drying and fresh connector devices can be speedily inserted into the cable connector.

The male and female parts of the connector and the pin can be made of aluminium silicon bronze or aluminium nickel bronze alloys. The ring of members can be made of a high strength cupro-nickel. Obviously, the materials from which the connector is made will be so chosen that they do not corrode in the environment in which the connector is to be used.

An embodiment of the invention will now be described solely by way of example and with reference to the accompanying drawings in which.

Figure 1:
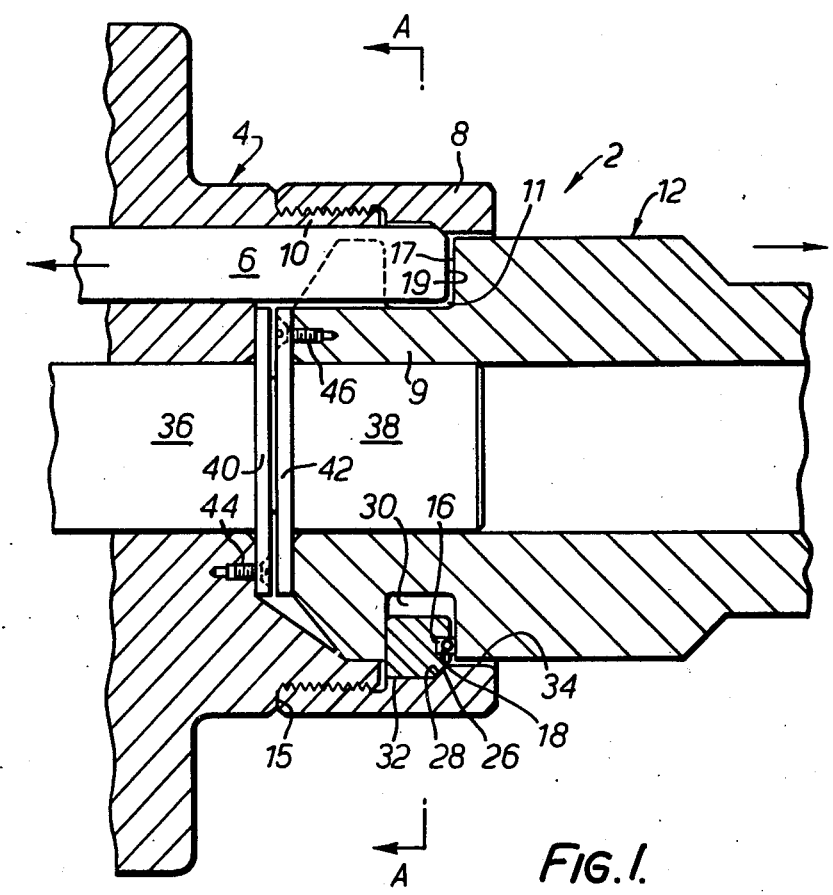
FIG. 1 is a longitudinal cross section through a cable connector in accordance with the invention.

Referring to the drawings, there is shown a cable connector 2 comprising a female portion 4 and a removable pin 6. The female portion 4 is provided with a collar 8 which screws over an externally threaded projecting flange 10.

The connector 2 further comprises a male portion 12 which has a ring of rollers 14. One face of each of the rollers 14 is provided with a recess 16 and these recesses 16 receive a circlip 18.

Figure 2:
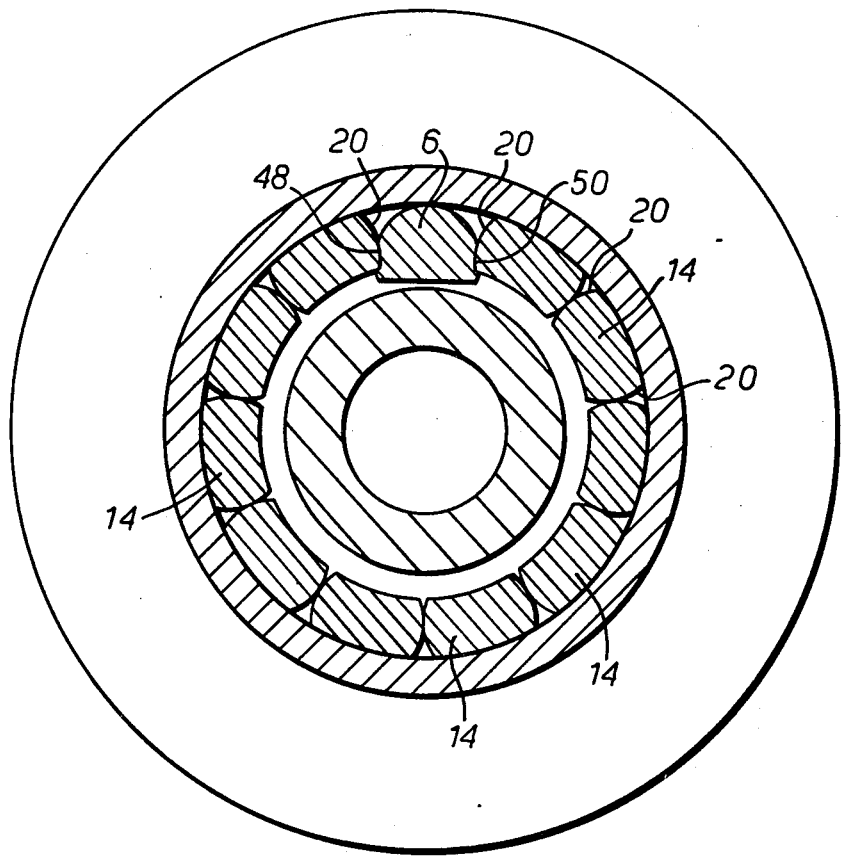
FIG. 2 is a section on the line A—A shown in FIG. 1.
Figure 3:
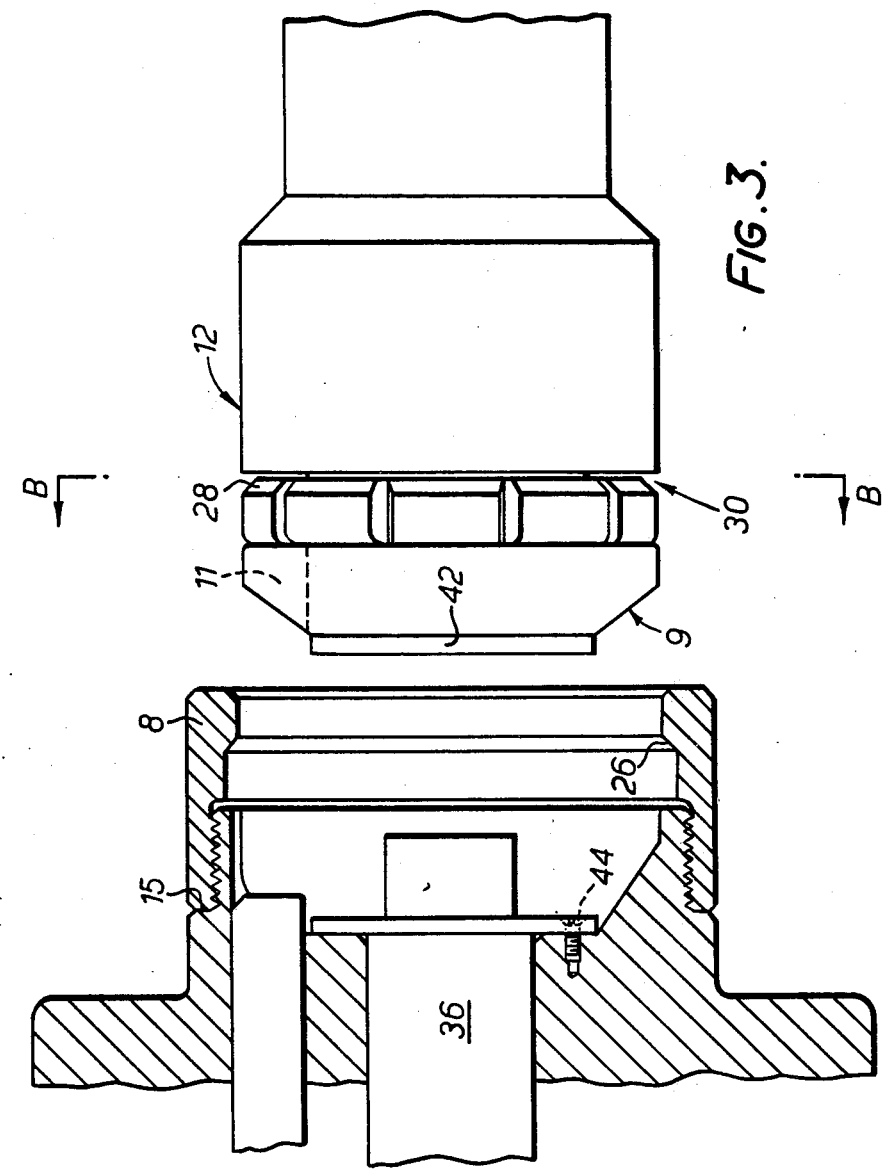
FIG. 3 is a part longitudinal cross section and part side view of the cable connector in its released condition.
Figure 4:
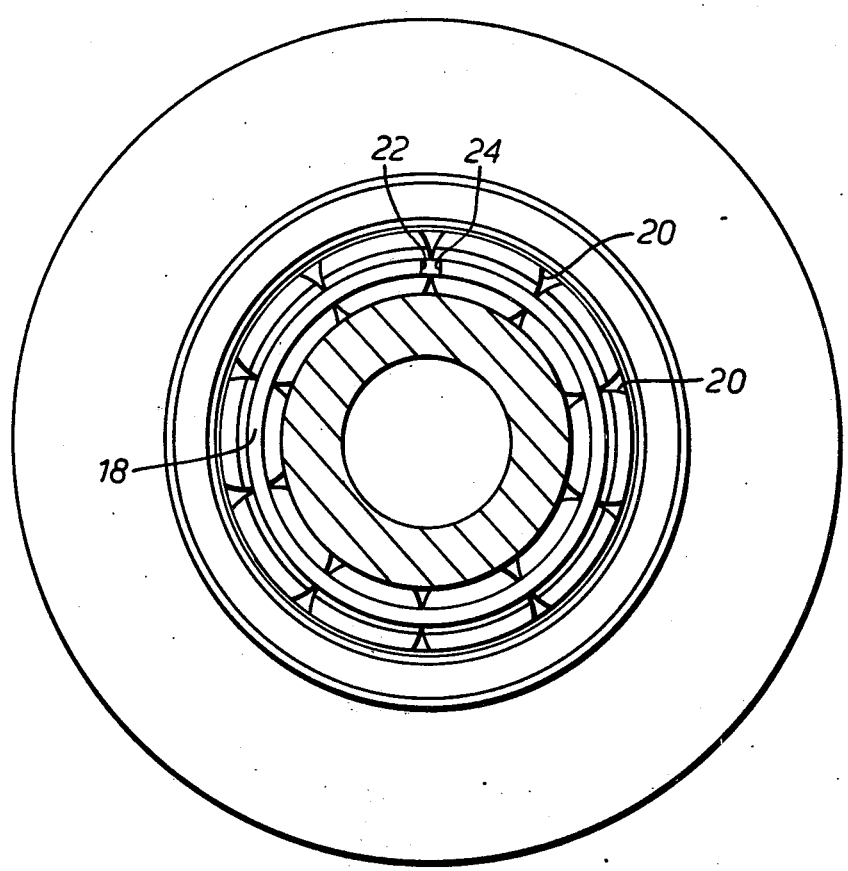
FIG. 4 is a section on the line B—B shown in FIG. 3.

As will be seen from FIGS. 2 and 4, the sides 20 of the rollers are convex so that they only touch each other at one central position. The circlip 18 passes through this central position. In this position of the circlip, it has been found that the rollers can move inwardly and outwardly but the ends 22, 24 of the circlip 18 do not substantially move with respect to the rollers 14 in which they are located.

The collar 8 is provided with an inwardly facing shoulder 26 and, as will be seen from FIG. 1, this shoulder 26 mates with a corresponding shoulder 28 formed on each of the rollers 14. When the pin 6 is inserted between a pair of rollers 14, see FIG. 2, the rollers 14 are displaced outwardly and the shoulder 28 on each of the rollers 14 engages the shoulder 26 on the collar 8. In this position, the male and female portions of the connector 2 cannot be pulled apart.

When the pin 6 is pulled out from between its pair of rollers 14, (e.g. by any suitable device connected to the pin 6) the shoulders 26, 28 co-operate to force the rollers 14 inwardly under axial load until the shoulders 26, 28 come out of engagement. More specifically, the rollers 14 move so far inwardly in a recess 30 formed in the male member 12 that the outer surface 32 of the rollers 14 clears the inner surface 34 of the collar 8. In this position, and under towing loads, the male and female portions of the cable connector 2 can easily be pulled apart.

Electrical cables or other types of cables or hoses can be connected to the male and female portions of the connector 2 in a well known manner. Also, if desired, the connector 2 can be provided with multi-pin cable connector devices 36, 38. These connector devices 36, 38 are well known per se and they will not be described in detail herein. It will be noticed however that the multi-pin cable connectors have flanges 40, 42 which are screwed in position to the remainder of the connector. Screws 44, 46 fit in counterbores in the flanges 40, 42. If the cable connector 2 is pulled apart under water, then the connector devices 36, 38 will become wet. The connector devices 36, 38 can quickly be replaced with dry connector devices. The wet connector devices 36, 38 can then be dried whenever convenient.

It is to be appreciated that the embodiment of the invention described above has been given by way of example only and that modifications may be effected. Thus, for example, the roller members 14 could be replaced by wedges. Also, the shape of the removable pin 6 could be varied and it is not necessary to scallop the sides of the pin at 48, 50 as shown in FIG. 2 to receive the convex sides of the rollers 14. Also, if desired, a locking ring (not shown) could be employed on the flange 10 so that the collar 8 would screw against this locking ring and would press it against a shoulder 15.

It will be seen from FIG. 2 that the pin 6 is approximately the same width as the rollers. Since the pin 6 pushes between the rollers 14 from the female member 4, it is necessary to provide the front end portion 9 of the male portion 12 with a slot 11. The pin 6 slides in this slot as it goes between the rollers 14. Since the slot 11 has to be big enough to receive the pin 6, and the rollers 14 are about the same width as the pin 6, it may be desirable to ensure that the roller members do not slip out through this slot 11. A locating pin (not shown) can thus be provided on the face 17 of the male member 12 and this locating pin can stop rotation of the rollers 14. When the pin 6 is pushed into position, its end face 19 can be provided with a recess (not shown) for receiving the locating pin.

What we claim is:

1. A connector for a cable, hose, or the like comprising a female portion having a collar, a male portion adapted to be joined with said female portion along a longitudinal axis of said connector, said male portion comprising a ring of engaging members spaced about the periphery of said male portion and adapted to be moved outwardly to engage the collar to retain the female and male portions together, means for moving said engaging members comprising a pin disposed offset from the longitudinal axis of the connector for insertion between a pair of engaging members to move the ring of members outwardly, and when removed from between a pair of engaging members, said members are adapted to move inwardly, wherein said members, when moved inwardly, disengage the male portion from the collar of the female portion, so that the male and female portions can separate.

2. A connector as claimed in claim 1, wherein said engaging members are positioned within a peripheral recess of said male portion, and said collar of said female portion comprises a shoulder means for mating with said engaging members when said engaging members are in their outward position.

3. A connector as claimed in claim 1, wherein said male portion includes a slot extending substantially parallel to the longitudinal axis of the connector for receiving said pin, said slot positioned at the periphery of the male portion.

4. A connector according to claim 1, in which the collar and female portion are threadingly connected.

5. A connector according to claim 4 in which the female portion is provided with a locking ring so that the collar can screw up to this locking ring.

6. A connector according to claim 1, in which the ring of engaging members is positioned in a recess in the male portion.

7. A connector according to claim 6 in which the ring of members is a ring of rollers.

8. A connector according to claim 7 in which the ring of rollers are held in their respective positions by a circlip.

9. A connector according to claim 8 in which the circlip is received in a groove formed in the face of the rollers.

10. A connector according to claim 9 in which the rollers have convex sides.

11. A connector according to claim 10 including electrical connector devices.

* * * * *